United States Patent
Coriz

(12) 
(10) Patent No.: US 6,758,496 B1
(45) Date of Patent: Jul. 6, 2004

(54) SHOULDER BELT RETENTION DEVICE

(76) Inventor: Wanda Coriz, 1850 Kellerton Dr., Hacienda Heights, CA (US) 91745

( * ) Notice: Subject to any disclaimer, the term of this patent is extended or adjusted under 35 U.S.C. 154(b) by 0 days.

(21) Appl. No.: 10/145,775

(22) Filed: May 15, 2002

(51) Int. Cl.[7] ............................................. B60R 22/00
(52) U.S. Cl. ...................................... 280/808; 297/483
(58) Field of Search .............................. 280/808, 801.2, 280/801.1; 297/483

(56) References Cited

U.S. PATENT DOCUMENTS

| | | | |
|---|---|---|---|
| 4,179,086 A | * 12/1979 | Yamada | 244/122 AG |
| 5,156,436 A | 10/1992 | Grene | |
| 5,580,133 A | 12/1996 | Knox et al. | |
| 5,931,503 A | * 8/1999 | Glendon | 280/808 |
| 6,053,580 A | 4/2000 | White, Sr. | |
| 6,086,158 A | * 7/2000 | Zeoli | 297/482 |
| 6,203,110 B1 | * 3/2001 | Proteau et al. | 297/483 |

\* cited by examiner

*Primary Examiner*—Son T. Nguyen

(57) ABSTRACT

A shoulder belt retention device for keeping the shoulder strap portion of a vehicle seat belt system in place and away from the child's face, thus providing the child with maximum comfort and protection. The shoulder belt retention device includes a main loop portion that is positionable around a shoulder of a user. A shoulder belt retaining portion is designed for selectively securing a shoulder belt of a vehicle restraint system. The shoulder belt retaining portion maintains the shoulder belt in a substantially fixed spatial relationship with the shoulder of the user such that the shoulder belt does not rub a neck of the user during use.

1 Claim, 4 Drawing Sheets

SHOULDER BELT RETENTION DEVICE

BACKGROUND OF THE INVENTION

1. Field of the Invention

The present invention relates to car seat restraints and more particularly pertains to a new shoulder belt retention device for keeping the shoulder strap portion of a vehicle seat belt system in place and away from the child's face, thus providing the child with maximum comfort and protection.

2. Description of the Prior Art

The use of car seat restraints is known in the prior art. U.S. Pat. No. 5,580,133 describes a car seat restraint comprised of a harness assembly. Another type of car seat restraint is U.S. Pat. No. 5,156,436 and U.S. Pat. No. 6,053,580 describe additional vehicle safety restraint devices.

While these devices fulfill their respective, particular objectives and requirements, the need remains for a system that keeps seatbelt out of the child's way allowing the child to be comfortable while keeping the seatbelt in the optimum position to protect the child.

SUMMARY OF THE INVENTION

Another object of the present invention is to provide a new shoulder belt retention device that is constructed of materials that are soft and comfortable so the user is not irritated during use.

Still another object of the present invention is to provide a new shoulder belt retention device that prevents the child from putting the shoulder strap behind them.

To this end, the present invention generally comprises a main loop portion that is positionable around a shoulder of a user. A shoulder belt retaining portion is designed for selectively securing a shoulder belt of a vehicle restraint system. The shoulder belt retaining portion maintains the shoulder belt in a substantially fixed spatial relationship with the shoulder of the user such that the shoulder belt does not rub a neck of the user during use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF PTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
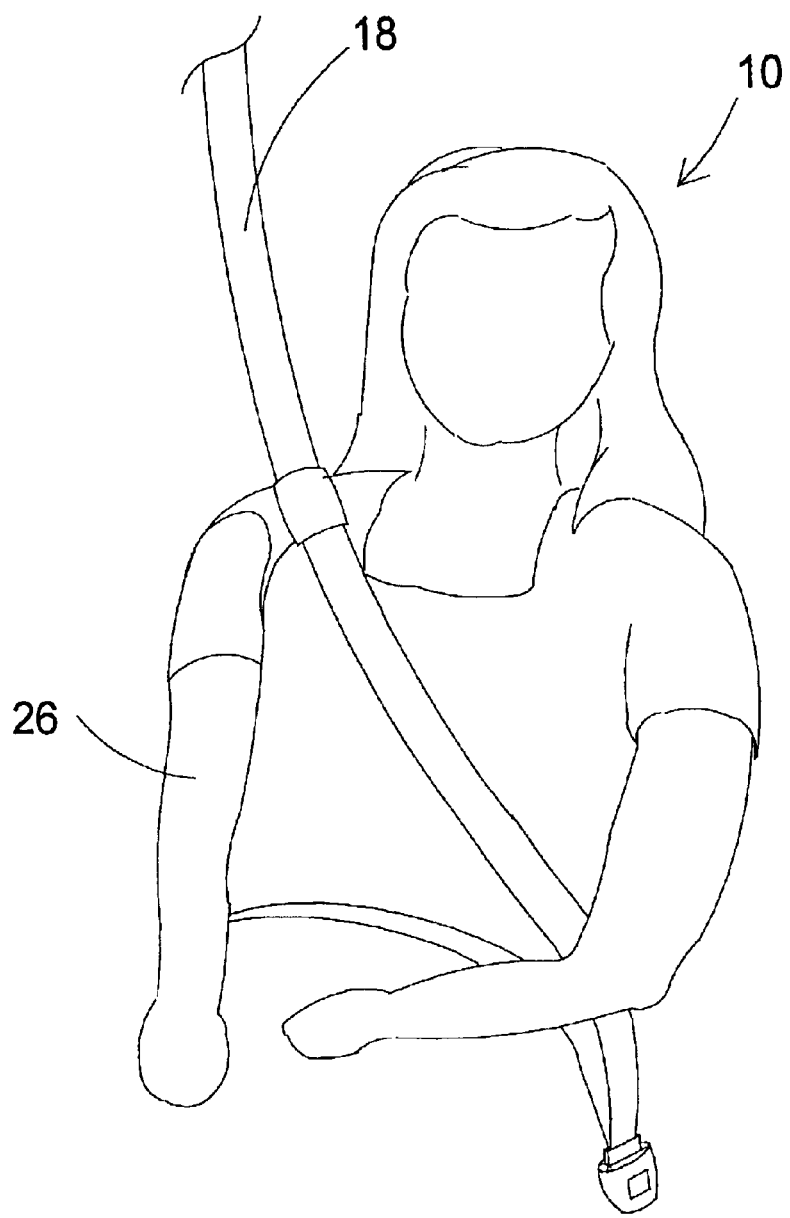
FIG. 1 is an in-use view of a new shoulder belt retention device according to the present invention.
Figure 2:
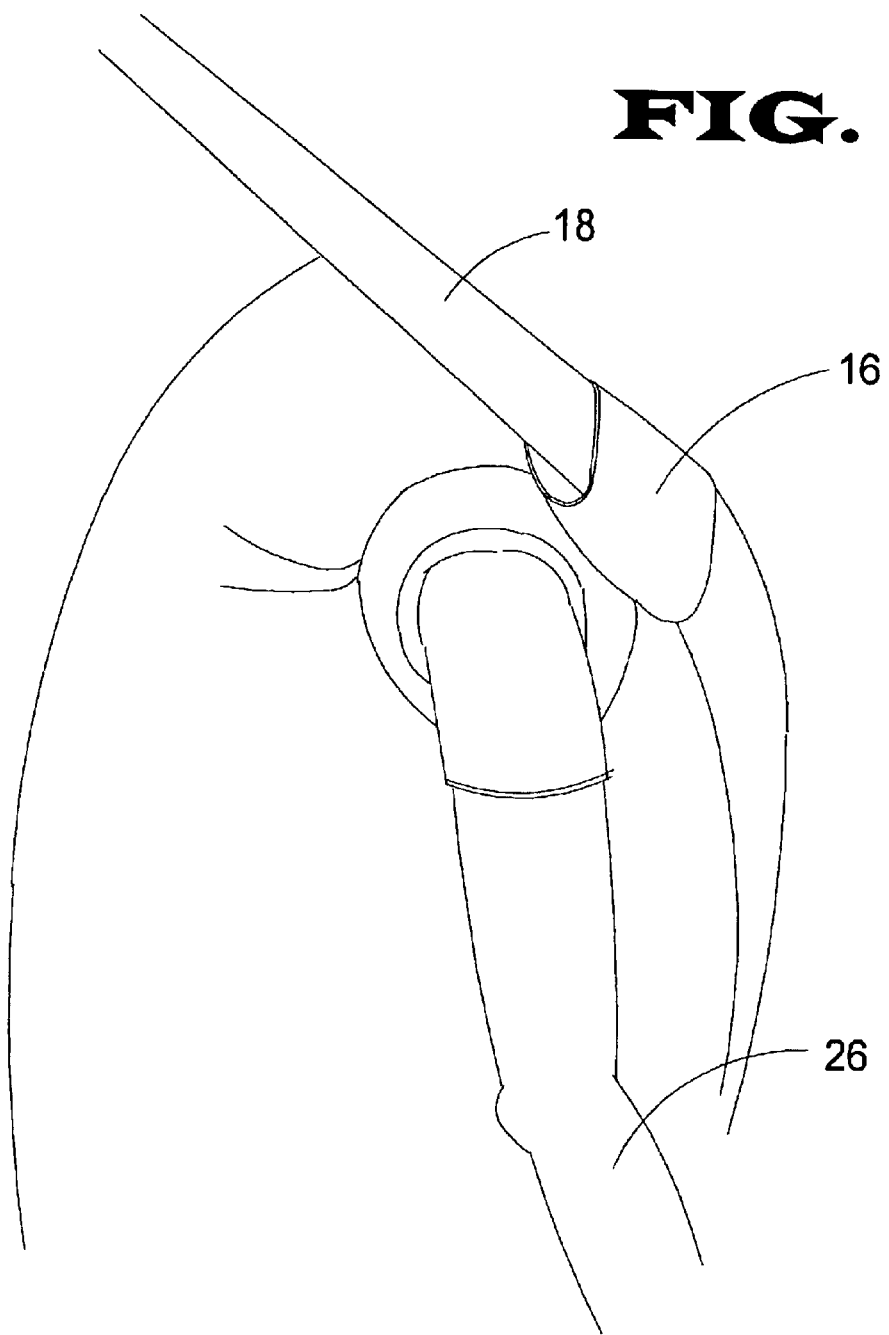
FIG. 2 is a side view of the present invention.
Figure 3:
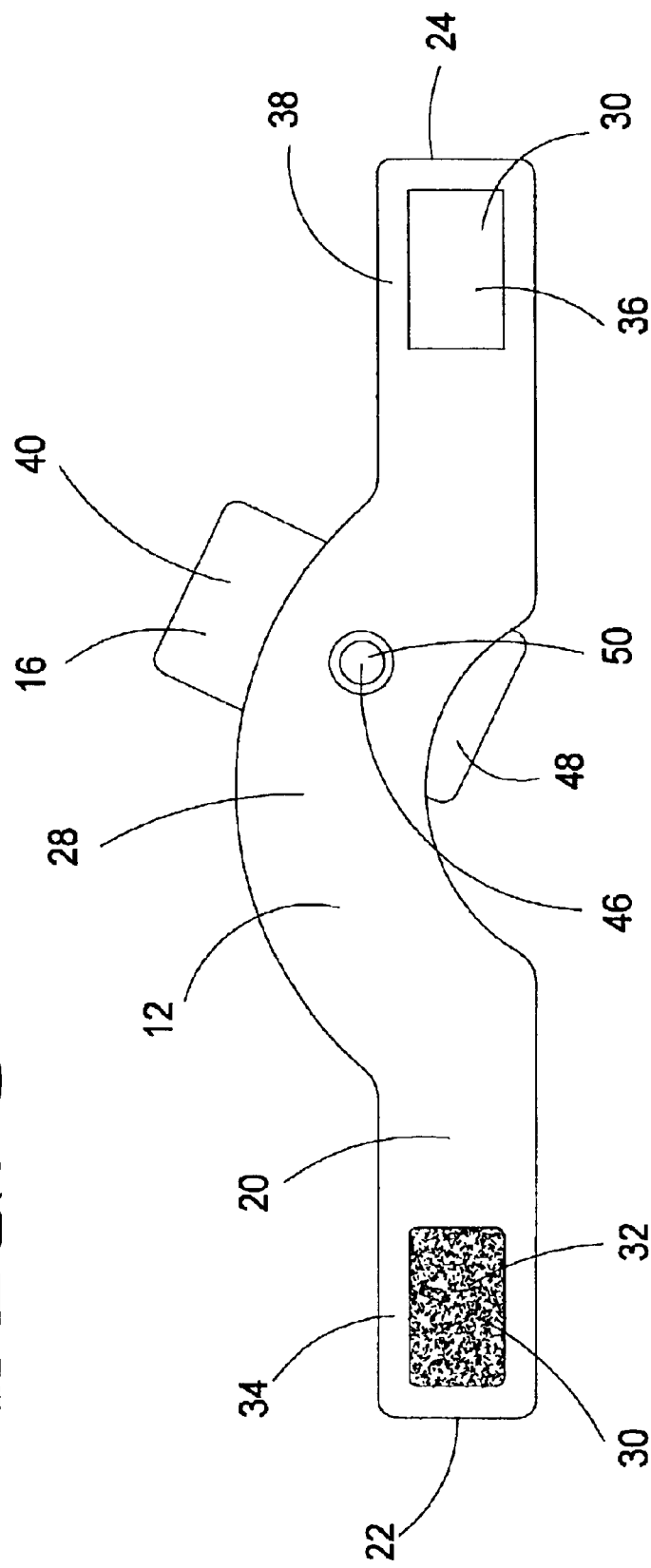
FIG. 3 is a front view of the present invention.
Figure 4:
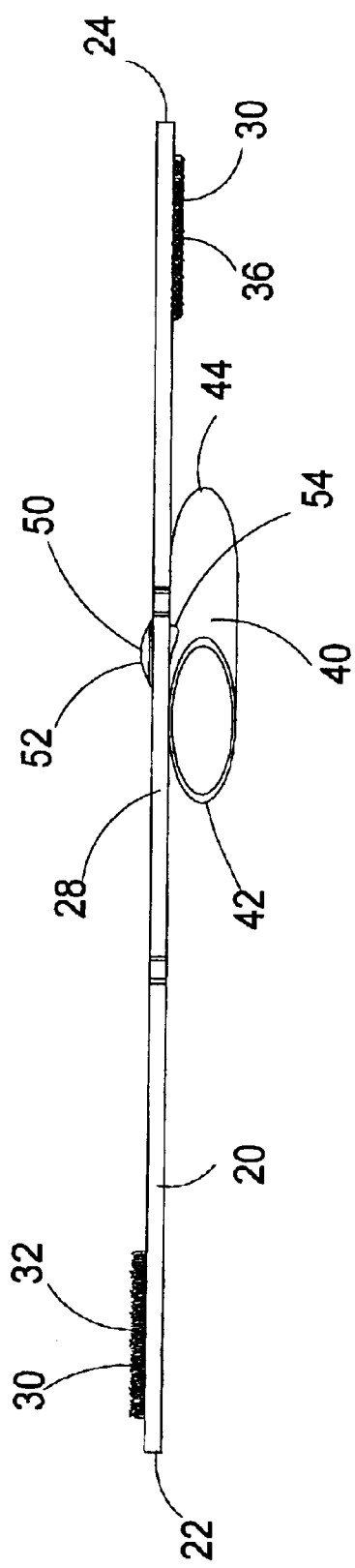
FIG. 4 is a perspective view of the present invention.

With reference now to the drawings, and in particular to FIGS. 1 through 3 thereof, a new shoulder belt retention device embodying the principles and concepts of the present invention and generally designated by the reference numeral 10 will be described.

As best illustrated in FIGS. 1 through 3, the shoulder belt retention device 10 generally comprises a main loop portion 12 that is positionable around a shoulder 14 of a user. A shoulder belt retaining portion 16 is designed for selectively securing a shoulder belt 18 of a vehicle restraint system. The shoulder belt retaining portion 16 maintains the shoulder belt 18 in a substantially fixed spatial relationship with the shoulder 14 of the user such that the shoulder belt 18 does not rub a neck of the user during use.

The main loop portion 12 further includes an elongate member 20 that has a first 22 and second 24 end. The first 22 and second 24 ends are positionable substantially under an arm 26 of the user. The main loop portion 12 is resiliently flexible. The elongate member 20 has a medial portion 28 positioned between the first 22 and second 24 ends. The medial portion 28 is arcuate. The medial portion 28 is for abutting an upper surface of the shoulder 14.

A fastening means 30 is for facilitating coupling the first end 22 to the second end 24 such that the elongate member 20 is formable into a loop. The fastening means 30 further includes a hook and loop fastener. A first portion of hook and loop fastener 32 is coupled to a first surface 34 of the first end 22. A second portion of hook and loop fastener 36 is coupled to a second surface 38 of the second end 24. The first 32 and second 36 portions of hook and loop fastener is complementary. The first 32 and second 36 portions of hook and loop fastener is alignable when the second end 24 overlaps the first end 22.

A shoulder belt loop member 40 is for wrapping around a segment of the shoulder belt 18. The shoulder belt loop member 40 has a first 42 and second 44 end. A shoulder fastening means 46 is for selectively coupling the first end 42 of the shoulder belt loop member 40 to the second end 44 of the shoulder belt loop member 40 wherein the shoulder belt loop member 40 is slideably coupled to the shoulder belt 18.

A belt coupling means 48 is for selectively coupling the shoulder belt retaining portion 16 to the main loop portion 12 facilitating rapid egress and ingress of the vehicle by the user. The belt coupling means 48 includes a snap 50. A first snap portion 52 is coupled to the shoulder belt retaining portion 16. The second snap portion 54 is coupled to the main loop portion 12. The first 52 and second 54 snap portions are complementary.

In use, a user would attach the present invention to the shoulder belt portion of a vehicles seatbelt system. The user would then seat the child in the seat of the vehicle and secure the present invention around the right arm and shoulder portion of the child. The shoulder belt portion of the vehicle's seat belt system would now be in optimal position to provide protection to the child.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shoulder belt retention device for use in conjunction with conventional vehicle restraint systems comprising:

a main loop portion positionable around a shoulder of a user; and a shoulder belt retaining portion adapted for selectively securing a shoulder belt of a vehicle restraint system, said shoulder belt retaining portion maintaining the shoulder belt in a substantially fixed spatial relationship with the shoulder of the user such that the shoulder belt does not rub a neck of the user during use;

wherein said main loop portion further comprises:

an elongate member having first and second ends, said first and second ends being positionable substantially under an arm of the user, said elongate member having a medial portion positioned between said first and second ends, said medial portion being arcuate, said medial portion being for abutting an upper surface of the shoulder; and a fastening means for facilitating coupling said first end to said second end such that said elongate member being formable into a loop;

wherein said fastening means further comprises a hook and loop fastener, a first portion of hook and loop fastener being coupled to a first surface of said first end, a second portion of hook and loop fastener being coupled to a second surface of said second end, said first and second portions of hook and loop fastener being complementary, said first and second portions of hook and loop fastener being alignable when said second end overlaps said first end;

wherein said main loop portion being resiliently flexible; and wherein a shoulder belt loop member for wrapping around a segment of the shoulder belt, said shoulder belt loop member having a first and second end;

a shoulder fastening means for selectively coupling said first end of said shoulder belt loop member to said second end of said shoulder belt loop member wherein said shoulder belt loop member being slideably coupled to said shoulder belt; and a snap, having a first snap portion and a second snap portion, said first snap portion being coupled to said shoulder belt retaining portion, said second snap portion being coupled to said main loop portion, said first and second snap portions being complementary, said snap allowing said shoulder belt retaining portion to pivot with respect to said main loop portion whereby the conventional vehicle restraining system maintains proper orientation as the user moves.

* * * * *